United States Patent [19]
Grantham

[11] 3,879,861
[45] Apr. 29, 1975

[54] CHARACTER ANALYSIS EDUCATIONAL GAME

[76] Inventor: Frederick W. Grantham, 600 S. Lairport St., Santa Monica, Calif. 90245

[22] Filed: Mar. 1, 1973

[21] Appl. No.: 336,979

[52] U.S. Cl. .................... 35/21; 35/28; 273/157 R
[51] Int. Cl. ........................................... G09b 19/00
[58] Field of Search ............. 35/21, 22 R, 23 R, 27, 35/28, 53; 273/157 R

[56] References Cited
UNITED STATES PATENTS

| | | | |
|---|---|---|---|
| 609,347 | 8/1898 | Holzhausen | 273/157 R |
| 723,425 | 3/1903 | Thompson | 273/157 R UX |
| 802,807 | 10/1905 | Fitch | 35/39 |
| 1,410,342 | 3/1922 | Newell | 35/22 R |
| 2,037,966 | 4/1936 | Dailey | 273/157 R |
| 2,506,894 | 5/1950 | Rowe | 35/21 |
| 2,647,330 | 8/1953 | Ford | 35/39 |

FOREIGN PATENTS OR APPLICATIONS

| | | | |
|---|---|---|---|
| 964,451 | 7/1964 | United Kingdom | 273/157 R |
| 995,270 | 8/1951 | France | 273/157 R |

*Primary Examiner*—Harland S. Skogquist
*Attorney, Agent, or Firm*—Henry M. Bissell

[57] ABSTRACT

A board member and a plurality of pieces, the pieces showing and describing physical features of a person and describing corresponding personal traits; the pieces are to be put in place in recesses in the board, and in the case of the head, in one form, a plurality of pieces when fitted together depicting the complete head; the pieces include a group representing each of different forms of each feature and the traits relating thereto; the pieces are separate from and detached from the board, and those in each group independently positionable for exposing only the top one of those pieces; and when all the groups are put in stacked position, the uppermost or exposed ones in the groups are in a common surface with the main top surface of the board.

5 Claims, 9 Drawing Figures

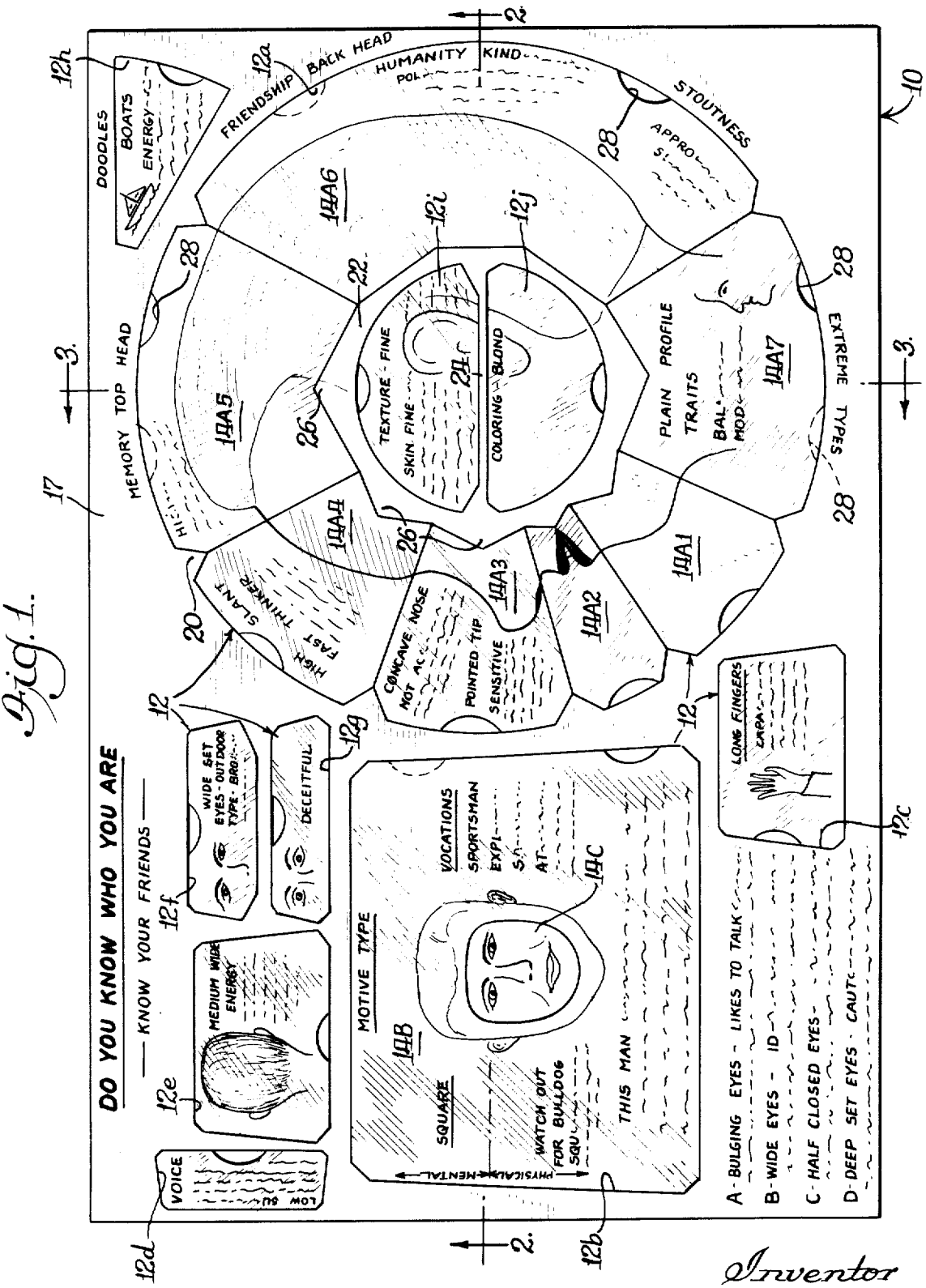

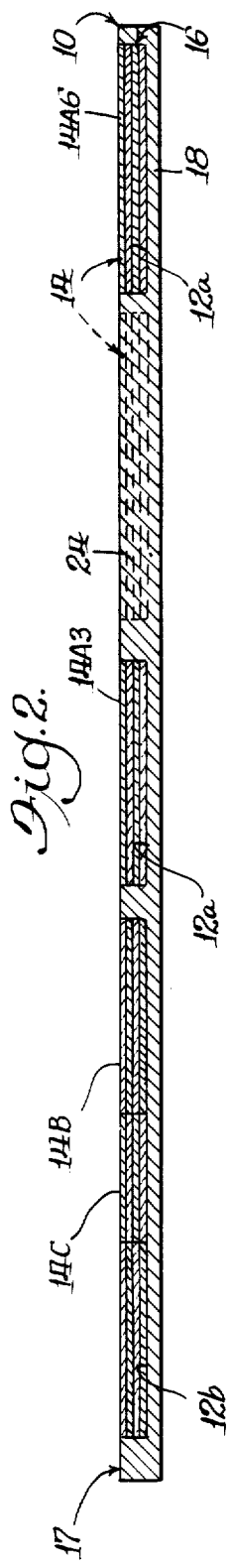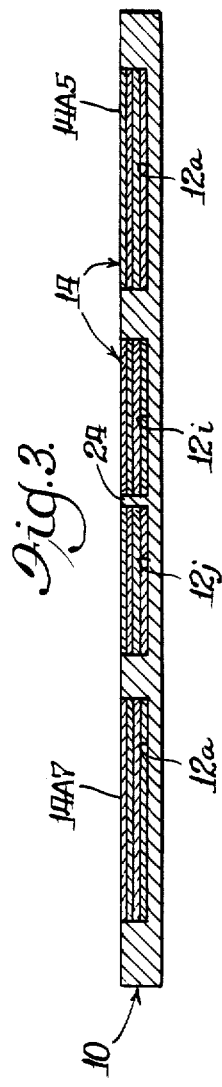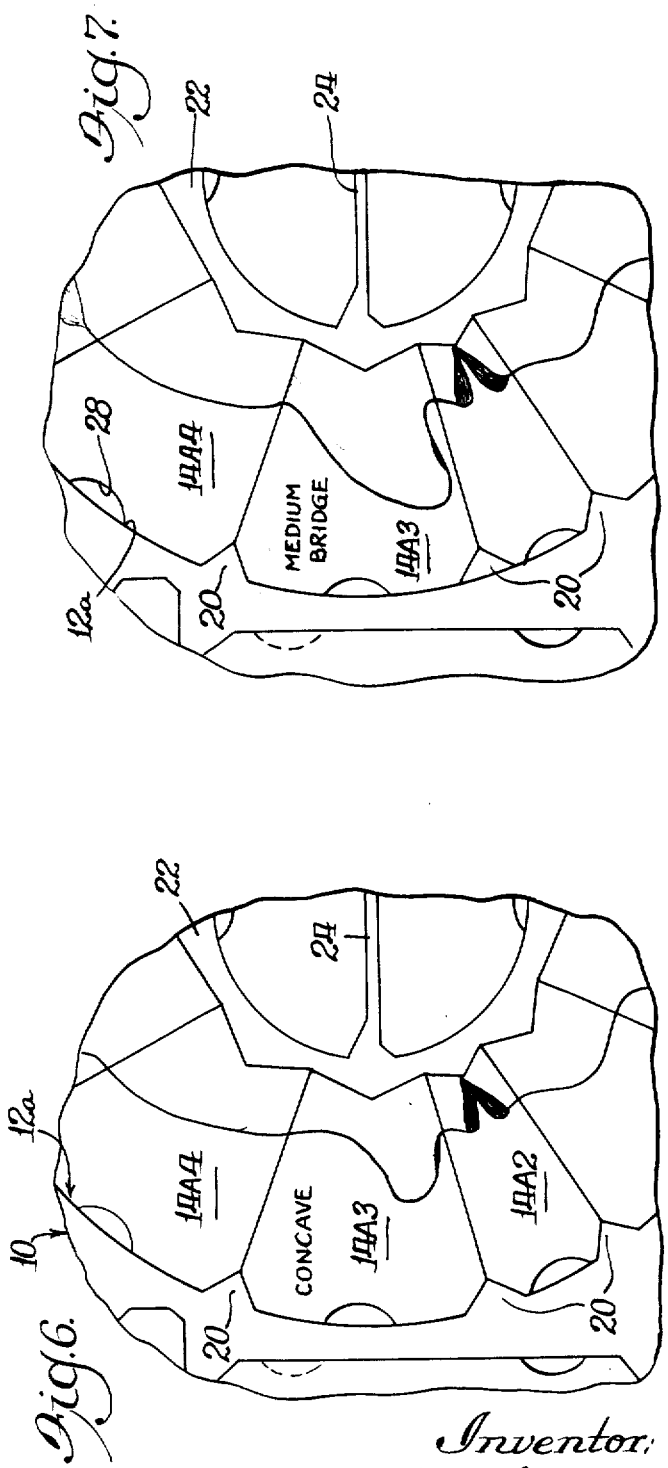

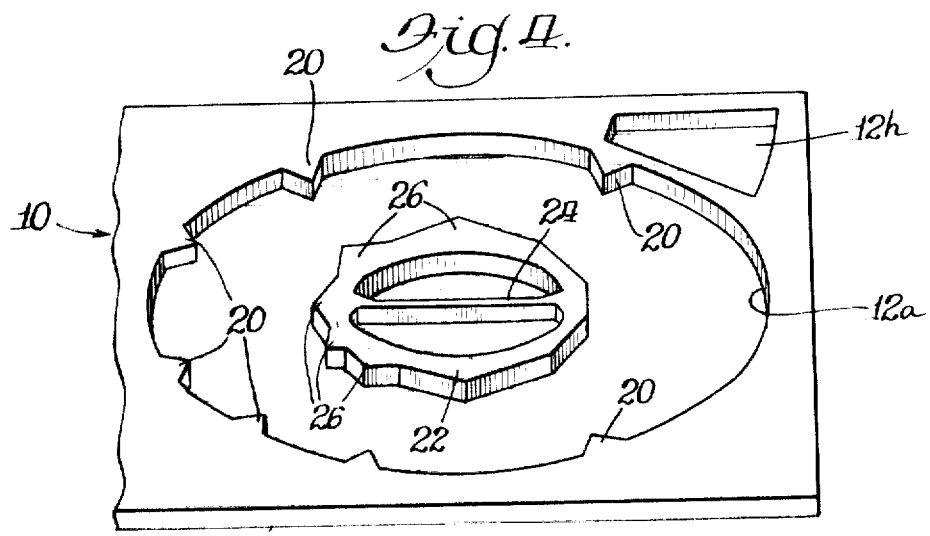
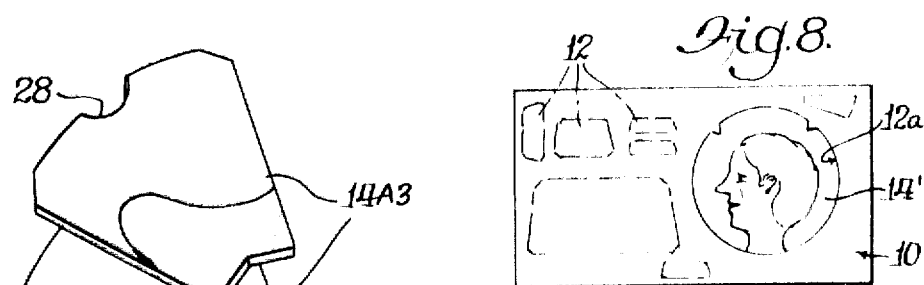
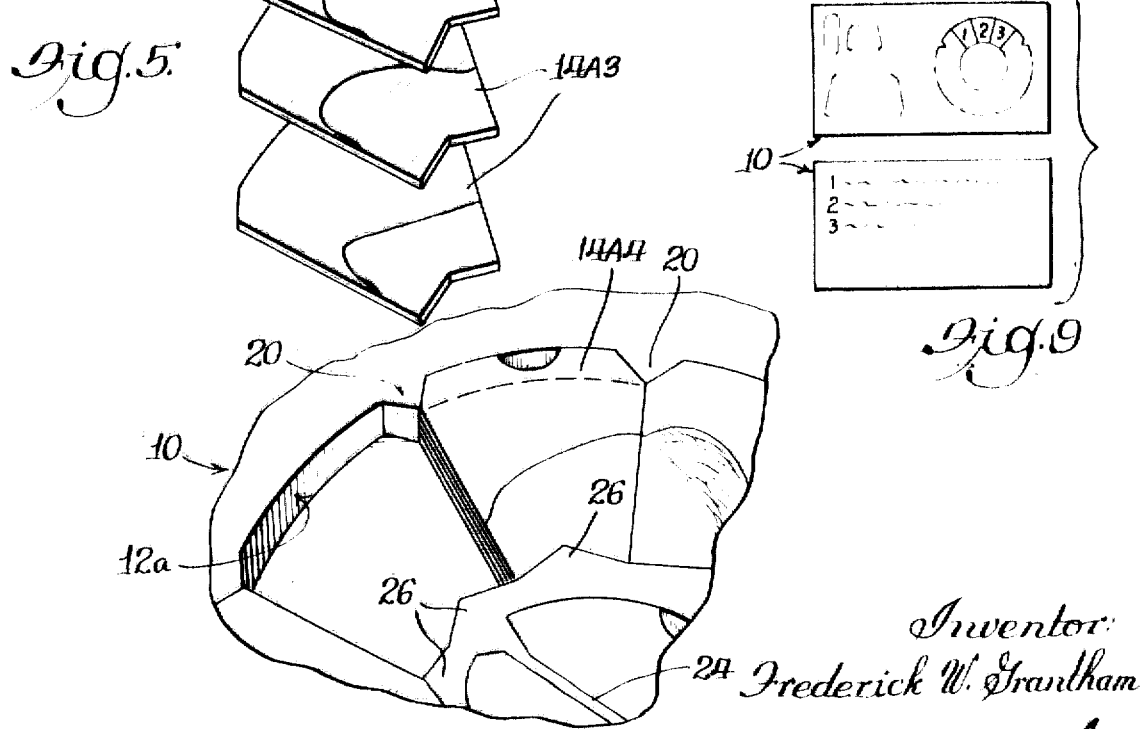

3,879,861

CHARACTER ANALYSIS EDUCATIONAL GAME

OBJECTS OF THE INVENTION:

A main and broad object of the invention is to provide a character analysis educational game for representing physical features of a person and corresponding personal traits related thereto, in a manner for facilitating an observer or "player" to observe a person and to understand or appreciate his personal traits relating to the physical features pictorially represented in the device.

Another and broad object of the invention is to provide a game of the kind referred to especially adapted for teaching an observer or "player" various personal traits associated with physical characteristics of a person, and to facilitate his remembrance of the observations made.

Still another object is to provide a game of the foregoing general character which includes a novel board construction containing a basic board member and a plurality of pieces which can be selectively positioned in the board in an arrangement in which a plurality of pieces together represent, for example, the head of the subject person, whereby to facilitate the observer's realization of the significance of the features observed.

A further object is to provide a novel physical board structure including a basic board member and a plurality of pieces selectively positionable in the board member, in a manner in which the various pieces cooperate to present at one time the overall pattern of traits of a subject being observed.

An additional object is to provide a game of the foregoing character, which includes a board member having recesses therein, and a plurality of pieces positionable in a stack in each recess and when so positioned therein the uppermost pieces in the stacks lie in a common plane with the top surface of the board member.

A still further, and more specific, object is to provide a game of the kind just immediately referred to wherein the pieces, when positioned in the recesses, normally are held therein by friction and do not drop out when the board member is merely moved as in handling it, although they can readily be removed by the fingers.

DESCRIPTION OF A PREFERRED EMBODIMENT:

In the drawings:

FIG. 1 is a face view of the board construction of the invention;

FIG. 2 is a sectional view taken at line 2—2 of FIG. 1;

FIG. 3 is a sectional view taken at line 3—3 of FIG. 1;

FIG. 4 is a perspective view of the right hand portion of the board member shown in FIG. 1 with the pieces removed therefrom;

FIG. 5 is a fragmentary perspective view of a small portion of the board member, and a plurality of pieces representing the same physical feature and arranged for positioning in a stack in the board member;

FIG. 6 is a face view of a portion of the board construction with certain selected pieces exposed showing only certain physical features of a person;

FIG. 7 is a view similar to FIG. 6 but with another piece exposed showing the same physical feature correspondingly represented in FIG. 6 but of another shape;

FIG. 8 is a face view of the board construction, of small scale and omitting most details, showing a modified form; and FIG. 9 is a face view of board surfaces, of another modified form of the device.

Referring in detail to the accompanying drawings, attention is directed first to FIG. 1 showing a rigid board member 10 of suitable outline dimensions provided with a plurality of recesses or cavities 12 including a main recess 12a, and other recesses 12b to 12j inclusive. The device also includes a plurality of insert pieces to be more fully described hereinbelow, the board member being of such thickness as to provide sufficient depth to the recesses 12 for receiving the pieces.

For convenience in referring to the various parts and components of the device the insert pieces may be identified generically at 14 although various ones are individually identified hereinbelow in the full description of the structure.

Referring to FIGS. 2 and 3, the recesses or cavities 12 are of such depth as to receive a plurality or stack of pieces, such for example as three, or four, although that particular number is not significant, and indeed it is within the scope of the invention that the pieces be only one deep. The board member includes a body 16 having a plane upper surface 17, and forming the walls around the various recesses, and including a bottom element 18 defining the lower surfaces of the recesses.

The main recess 12a preferably is of generally circular form and is arranged for depicting the profile of the human head and in this representation it is desired that the plurality of insert pieces be of wedge shape, which together form a continuous insert structure or group which fill the complete recess. For convenience the insert pieces 14 in the cavity 12a are individually identified 14A1 to 14A7 inclusive. The board includes a plurality of points 20 projecting inwardly from the periphery of the recess for engaging the insert pieces on opposite sides thereof, and positioning them angularly. The pieces nevertheless mutually abut circumferentially around the recess. The insert pieces are of course tapered at their outer corners to fit to the points 20. The pieces 14 are all of different angular dimensions so that no one could properly fit in the place of any other one. It is also within the invention to utilize a single insert piece in the cavity 12a as represented in FIG. 8 and referred to again hereinbelow.

The board member also includes, in the recess 12a, a center ring 22 which is part of the body of the board member and correspondingly upraised from the bottom surface of the recess, and together with a cross rib 24 defines internal recesses or cavities 12I, 12J, together being of generally circular shape.

The main recess 12a thus includes angularly juxtaposed portions, and the insert pieces 14 therein fit together in side by side relation, and all when fitted together form a continuous surface in circumferential direction. The outer surface of the inner ring 22 is provided with irregular shapes such as points 26, each being positioned for engagement by corresponding ones of the insert pieces 14 and accordingly being respectively positioned between adjacent ones of the points 20, the insert pieces being correspondingly shaped to interfit with those points. Each of the insert pieces is preferably provided with a notch 28 for insertion of the finger for facilitating removal of the pieces from the recesses.

The insert pieces 14 in the main recess or cavity 12a when considered all together circumferentially depict the head of the human body. These insert pieces are dimensioned or divided according to the desired representation of the different features of the head, such as the chin, the mouth, the nose, the forehead, etc. There are a plurality of each kind of piece all of the same outline dimensions and shape, and all representing the same physical feature of the head. For example, referring to the insert pieces 14A3 which represent the nose, and reference is made to FIG. 5 in this respect, each of those pieces depicts a different shape of the nose, such as aquiline, concave, etc. The same is true with all of the other pieces representing different portions of the head. The arrangement with respect to the recess 12a and the insert pieces therein is such that angular division is made so that the respective pieces represent main features of the head each of which indicates a main personal trait. The pieces, or at least most of them, also bear description of the personal traits related to the physical features shown.

As indicated above, the number of insert pieces in any one group or stack, may be of any desired number, and they are of such thickness, relative to the depth of the recesses or cavities, that the uppermost piece, i.e., the one exposed, lies in the plane of the upper surface of the board member. This relation enables all the insert pieces to be positioned in the recesses, so as to eliminate the necessity for extra space, or containers, for containing the unused pieces.

The various insert pieces which can be inserted in the recess 12a for example, preferably form a continuous figure or outline, the line of the portion of the head in each piece continuing into and meeting with the line of the feature of the adjacent piece.

The user of the board, or the "player," in observing a person, considers for example the nose first, and lifts out the group or stack of pieces 14A3 and in looking through the various ones of that stack thereof, he finds that, as represented in FIG. 1, the subject has a concave nose. He then puts that one insert piece at the top of the stack and inserts the stack back into the respective portion of the recess 12a. Then he may consider the mouth for example and lifts out the group of pieces 14A2 and does the same with that group, putting the piece which most nearly represents the shape of the mouth of the subject on the top of the stack, and reinserts the stack into the respective portion of the recess. He then does the same with respect to the forehead, the top of the head, the back of the head, and the remaining parts. When he finishes the complete assembly, those insert pieces that are on the top of the stacks and exposed depict most closely the subject considered.

With respect to the recesses 12I, 12J, the same steps are followed and these insert pieces represent the ear for example, and include descriptions of other features, particularly the hair, such as whether it is coarse, fine, etc.

The insert pieces preferably bear representations on both sides, so as to be reversible and provide maximum depictions for a minimum number of pieces. The pieces are all of course symmetrical about a central radial line, except possibly for the notches 28.

It is also possible to identify the insert pieces individually, as by number, and provide the descriptions of the traits related thereto at a common location, as on the back of the same board, or on a different board, such as shown in FIG. 9, although the preferred form is to provide the descriptions on the same pieces showing the physical shape to which the description applies.

When the complete assembly is made of the insert pieces as described and represented at the right hand portion of FIG. 1, the observer can then analyze the characteristics of the person according to his physical features and particularly as described in the inscriptions on the respective insert pieces. FIGS. 6 and 7 show the face portions of the subject, and respectively show for example different shapes of nose, these shapes being represented in respective ones of the insert pieces 14A3, thus showing practical effects of the use of the board.

Returning again to FIG. 1 the recesses or cavities 12b to 12h, are associated with insert pieces 14B to 14H inclusive, the insert pieces representing other characteristics of the person not represented by the pieces in the recess 12a. For example, in the recess 12b is a stack of inserts 14B, 14C, the latter within the former, representing the front view of the face. As in the other cases, this stack includes a number of such pieces and the observer places the one piece on the top that most closely represents the person observed. In this instance the large pieces 14B show the outline of the head, while the smaller pieces 14C therewithin include only the face.

The other recesses 12 have to do with other features such as the voice, the back of the head, the eyes, the hands, and even the habits of the person such as writing, scribbling or doodling.

All of the insert pieces in the recesses 12c – 12h are non-regular in shape, e.g., tapered so that they will fit in only a certain way in the recesses. Moreover, those in each recess are of different shape from those in the others, so that only those belonging to that recess will properly fit therein. For example, one may be longer but narrower, the other shorter but wider, or have characteristically shaped corners, etc. Additionally all of the insert pieces as described in connection with the recess 12a, are symmetrical about a "longitudinal" line, i.e., such a line between the opposed tapered lines.

FIG. 8 shows the same board but instead of the plurality of pieces 14, a single piece 14 is utilized to show the complete head in profile. While the preferred construction includes a plurality of segments to form the head, it is within the scope of the invention to utilize such single piece.

The insert pieces and recesses preferably are of such relative dimensions that the pieces are normally held in place by friction. In the case of the pieces 14A they are of course confined against displacement laterally and from one part of the recess to another.

The user of the educational game accordingly can learn a great amount about a person by putting the respective insert pieces representing the subject's features in the corresponding positions and at the same time reading the descriptions of the personal traits associated therewith. He will learn to analyze a subject and be able to understand his makeup to a much greater degree and much faster than would otherwise be possible.

Another great advantage of the invention is in the mechanical construction of the device, and in its direct association with its use. Since the insert pieces are of such thickness that the top or exposed piece lies flush with the plane of the face of the board, the top pieces in all the recesses all lie in a common plane, which renders it very easy for the user to observe the complete "picture." Similarly, since the pieces are retained in the recesses by friction, the board may be handled in any manner, within reason, without the pieces falling out, but the pieces can nevertheless be removed easily by the user by simply inserting the finger in the notches 28 and lifting them out. Accordingly, there is no necessity for other containers for holding pieces that are not being used, or in other words the board member and all the pieces are contained effectively as a single monolithic device, and as such can be placed anywhere without fear of losing any of the parts of the device.

Still another advantage of the device is being able to present in a single representation, or unified form, substantially all the features, or at least the principal ones, of a person in exposed form, or in a "picture" on a single board, as distinguished from a series of separate elements, as for example leaves of a book, etc.; in this case all of the features are presented simultaneously, totally in a single pictorial representation on a single surface, and entirely observable by the user at a glance, the only necessity being moving the eyes from one point of the board to another.

I claim:

1. An educational game comprising:
    a board member having an angular and circumferentially continuous first recess conforming generally to a section of a circle with a center portion removed, the board member having a supporting bottom element extending across the bottom of the first recess;
    the board member including a fixed outer element forming a radially inwardly facing, generally circular, outer wall and a fixed inner element forming a radially outwardly facing, polygonal, perimeter wall, the two walls with the bottom element defining said first recess;
    said inner element including two supplementary recesses and corresponding supplementary pieces in a stack in each of the supplementary recesses, and the supplementary recesses having different shapes, whereby the supplementary pieces can be properly placed in only one of the supplementary recesses;
    the outer perimeter wall having a plurality of inwardly directed projections selectively located to define distinct angular segments of the first recess;
    the inner perimeter wall having a plurality of outwardly directed projections selectively located to define a radially directed axis of symmetry for each angular segment; and
    a plurality of stacks of pieces insertable in the first recess and extending between the walls, each piece having distinct dimensions and being configured to mate with the respective projections of a corresponding angular segment and further having a radially directed axis of symmetry aligned with the axis of symmetry of its corresponding angular segment so as to permit placement of said piece either side up in said segment;
    the pieces each having a representation of a portion of the human head thereon and altogether forming a circumferentially continuous series cooperating to form a continuous representation of the head;
    the pieces including a plurality of surfaces depicting different forms of each feature of the head.

2. An educational game according to claim 1 wherein the first recess includes representations of the head of the body, and further wherein the board member includes additional recesses and pieces fitted therein, each additional recess and its corresponding piece having unique dimensions so that a given piece can be received in only its corresponding recess, the pieces in the additional recesses being directed to portions of the body other than the head, such as the nose, eyes, chin, and further wherein said additional recesses and the pieces therein are symmetrical about only a single longitudinal axis, whereby the pieces may be positioned therein in either of only two reversed positions, and the pieces having corresponding representations on each of the two opposite sides.

3. An educational game as according to claim 1, wherein,
    each piece has thereon, in addition to the representation of the portion of the head, written information describing personal traits indicated by the pictorial representation of the corresponding portion of the head.

4. An educational game according to claim 1 wherein each piece has a representation of the same portion of the head on each side, and the representation of all the pieces exposed is continuous regardless of which side is exposed of any individual piece.

5. An educational game according to claim 1 wherein the board member also has supplementary recesses, and supplementary pieces including at least one insertable into each of the supplementary recesses,
    the supplementary pieces each having visual information covering a human characteristic, including at least one of the following: the hand, the front of the head, the back of the head, details of the eyes, sound of the voice, the kind of doodling a person indulges in.

* * * * *